A. KIENAST.
TURBINE BLADE.
APPLICATION FILED FEB. 17, 1911.
994,166.
Patented June 6, 1911.
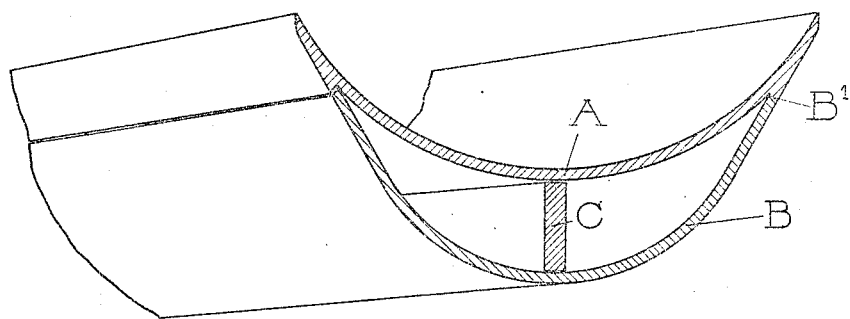
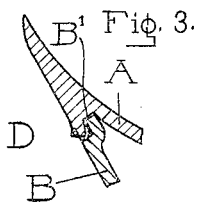
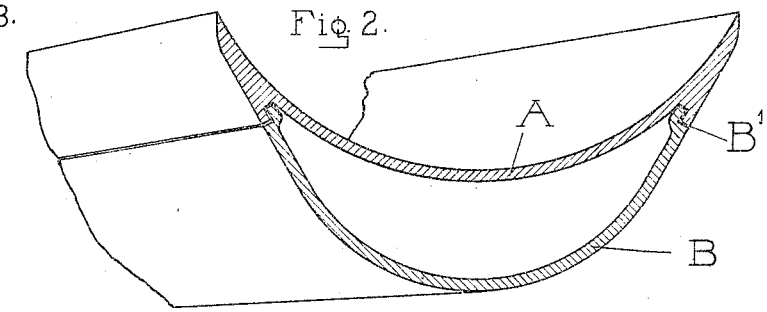
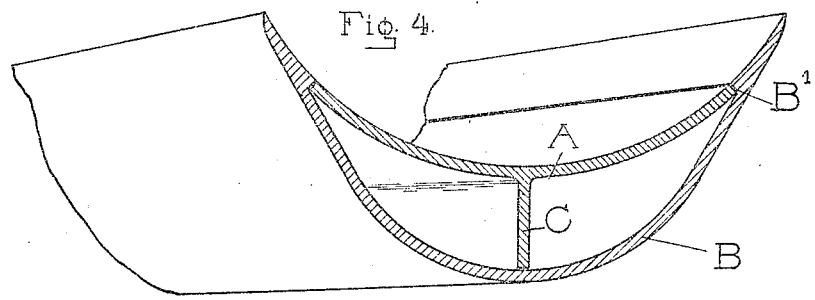
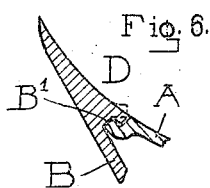
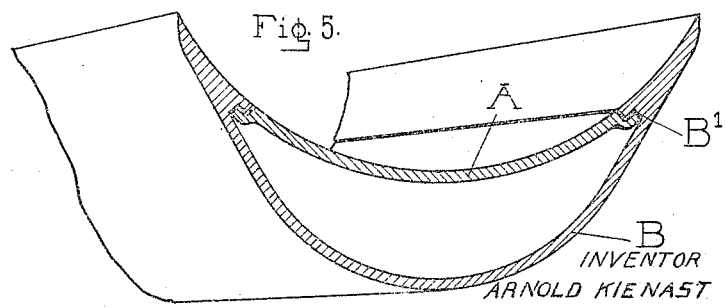
WITNESSES
INVENTOR
ARNOLD KIENAST
BY
ATTORNEYS

UNITED STATES PATENT OFFICE.

ARNOLD KIENAST, OF LEIPZIG, GERMANY.

TURBINE-BLADE.

994,166.  Specification of Letters Patent.  Patented June 6, 1911.

Application filed February 17, 1911. Serial No. 609,176.

*To all whom it may concern:*

Be it known that I, ARNOLD KIENAST, a citizen of the Swiss Republic, and a resident of Leipzig, Germany, have invented certain new and useful Improvements in Turbine-Blades, of which the following is a specification.

My invention relates to turbines provided with a number of blades and has for its object to provide a blade having a sheet metal body, the front and rear portion of which is joined together by grooving or other equivalent means.

Details of my invention relate to means for stiffening said blade bodies and for making more secure the groove joints just spoken of.

My invention will be better understood by reference to the drawings in which—

Figure 1 illustrates, in perspective, a segment of a blade body made according to my invention in which is employed a straight grooved joint on each side of the rear of the said body; Fig. 2 is a view similar to Fig. 1, in which the groove is L shaped; Fig. 3 is a partial view similar to Fig. 2 showing a modification of the L-shaped groove there used; Fig. 4 is a view similar to Figs. 1 and 2 showing the straight groove of Fig. 1 placed on the front side of the blade body; Fig. 5 illustrates similarly a blade body made according to my invention in which the L-shaped groove of Fig. 2 is placed on the front side of the blade body instead of at the rear; and Fig. 6 is another partial view, similar to Fig. 3, in which the modified L-shaped groove in Fig. 3 is applied to the front side of the blade instead of to the rear side.

In all of the figures A represents the front portion of the blade body; B the rear portion and B′ the grooved joint. In Figs. 1, 2 and 3 the joint is on the rear side of the blade body and in Figs. 4, 5 and 6 the joint is on the front side of the blade body. The portions A and B are preferably made of sheet metal of suitable thickness, which may be either punched, or rolled and cut to suitable lengths, or formed in any other preferred manner.

In the various forms shown the grooves B′ are always placed sufficiently far from the edge of the blade bodies so that the passage of steam over said bodies is not impeded.

The portions A and B, if their sizes and shapes be suitably determined, will hold together at the grooves by reason of their natural elasticity. The joints shown in Figs. 2, 3, 5 and 6 are locked together more positively than the joints of Figs. 1 and 4. In Figs. 2 and 5 the L-shaped grooves in portions A and B respectively are cut so that the companion portions B and A respectively may slip into position readily. In the form of groove shown in Figs. 3 and 6 the groove in the female element is cut somewhat narrower than in Figs. 2 and 5 and the tongue D then bent outwardly; after the male element has been inserted into this groove the tongue D is again bent inwardly so as to clamp the walls of the female element firmly upon the edges of the male element. For added security the joints may be soldered if desired.

By inserting members C between the front and rear portions of the blade body each blade body as a whole may be stiffened and the joint made more secure. In Fig. 1 the stiffening member C is made separate from either front or rear portion and contacts with both of said portions to which it may be united by soldering or any equivalent means. In Fig. 4 the member C is integrally a part of the front portion A being formed at the same time with A in the manufacturing operation. In this case the member C may be also joined to the rear portion B by soldering or by some equivalent means, or it may remain physically disconnected with B although in contact therewith; this member C may of course be made integral with the rear portion B instead of with the front portion A.

Blade bodies made according to my invention are light, stiff, have smooth surfaces and require a substantially less weight of material than do solid blade bodies. Being of sheet metal, they are uniform in strength throughout and not subject to the weakness of cast metal bodies which may have flaws or blow holes not readily to be detected. Further advantages of blade bodies may according to my invention reside in the fact that they can easily and quickly be manufactured and assembled, each blade body being identically like every other blade body and the individual parts standardized so as to be perfectly interchangeable. The blade bodies themselves are equally interchangeable. Replacement of an entire blade body or of portions of individual blade bodies in case of wear or breakage is equally easy.

The thickness of the blade body portions may, of course, be varied in accordance with variations in size of the turbines in which they are to be employed as also in accordance with variations in the character of the duty to be imposed upon them. Similarly either the front or rear portion of the blade bodies may be made thicker or thinner as the case may be in accordance with the requirements.

Having described my invention, I claim:

1. As a new article of manufacture a turbine blade comprising a sheet metal front portion and a sheet metal rear portion said portions being united at grooved joints.

2. As a new article of manufacture a turbine blade comprising a sheet metal front portion and a sheet metal rear portion said portions being elastically united at grooved joints.

3. As a new article of manufacture a turbine blade comprising a sheet metal front portion and a sheet metal rear portion one of said portions being provided with a tongued groove engaging the edge of the other portion with the tongue pressed down against said edge one of said portions also pressing elastically against the other at said groove.

4. As a new article of manufacture a turbine blade comprising: a sheet metal front portion and a sheet metal rear portion one of said portions being provided with a tongued groove engaging the edge of the other portion with the tongue pressed down against said edge, one of said portions also pressing elastically against the other at said groove; and a stiffening member between said front and rear portions.

5. As a new article of manufacture a turbine blade comprising: a sheet metal front portion and a sheet metal rear portion one of said portions being provided with a tongued groove engaging the edge of the other portion with the tongue pressed down against said edge, one of said portions also pressing elastically against the other at said groove; and a stiffening member between said front and rear portions integrally united to at least one of said portions.

In testimony whereof I have hereunto set my hand in the presence of two subscribing witnesses.

ARNOLD KIENAST.

Witnesses:
ALBERT R. MORAWETZ,
RUDOLPH FRICKE.